United States Patent
Muratsubaki

(10) Patent No.: US 11,668,373 B2
(45) Date of Patent: Jun. 6, 2023

(54) TENSIONER LEVER

(71) Applicant: TSUBAKIMOTO CHAIN CO., Osaka (JP)

(72) Inventor: Kenji Muratsubaki, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 108 days.

(21) Appl. No.: 17/308,587

(22) Filed: May 5, 2021

(65) Prior Publication Data

US 2021/0356022 A1 Nov. 18, 2021

(30) Foreign Application Priority Data

May 14, 2020 (JP) .............................. JP2020-084854

(51) Int. Cl.
  *F16H 7/08* (2006.01)
  *F16H 7/06* (2006.01)
  *F16H 7/18* (2006.01)

(52) U.S. Cl.
  CPC ................. *F16H 7/08* (2013.01); *F16H 7/06* (2013.01); *F16H 2007/081* (2013.01); *F16H 2007/0863* (2013.01); *F16H 2007/0872* (2013.01); *F16H 2007/0893* (2013.01); *F16H 2007/185* (2013.01)

(58) Field of Classification Search
  CPC ..... F16H 7/06; F16H 7/08; F16H 7/18; F16H 2007/081; F16H 2007/0863; F16H 2007/0872; F16H 2007/0893; F16H 2007/185; F02B 67/04; F02B 67/06
  See application file for complete search history.

(56) References Cited

U.S. PATENT DOCUMENTS

| | | | | |
|---|---|---|---|---|
| 3,148,555 A | * | 9/1964 | Peras | .......................... F16H 7/08 |
| | | | | 474/111 |
| 4,976,659 A | * | 12/1990 | Hans | ..................... F16H 7/0834 |
| | | | | 474/111 |
| 6,428,435 B1 | * | 8/2002 | Kumakura | ................ F16H 7/08 |
| | | | | 474/140 |

(Continued)

FOREIGN PATENT DOCUMENTS

| CN | 109667897 A | * | 4/2019 | ............... F16H 7/08 |
|---|---|---|---|---|
| CN | 109667898 A | * | 4/2019 | ............... F16H 7/08 |

(Continued)

*Primary Examiner* — Michael R Mansen
*Assistant Examiner* — Raveen J Dias
(74) *Attorney, Agent, or Firm* — WHDA, LLP

(57) ABSTRACT

An object of the present invention is to provide a tensioner lever that allows for reduction of the number of components and the weight, while being able to prevent vibration and noise during the running of the chain. The tensioner lever according to the present invention is configured such that a lever body rotatably supported on an attachment surface is urged to rotate toward the chain by the resilient force of a coil spring. The coil spring includes a pressing arm extending from one end of a helical part and contacting the lever body, and a support arm extending from another end of the helical part and supported by the attachment surface. The lever body includes an engagement portion configured to allow the support arm of the coil spring to be hooked thereon by resilient deformation, and to removably engage therewith by rebound resilience of the coil spring.

4 Claims, 2 Drawing Sheets

(56) References Cited

U.S. PATENT DOCUMENTS

| | | | |
|---|---|---|---|
| 8,092,327 B2 * | 1/2012 | Kobara | F02B 67/06 |
| | | | 474/111 |
| 9,772,008 B2 * | 9/2017 | Noro | F16H 7/08 |
| 10,408,312 B2 * | 9/2019 | Noro | F16H 7/08 |
| 11,371,591 B2 * | 6/2022 | Muratsubaki | F16H 7/06 |
| 11,434,980 B2 * | 9/2022 | Watanabe | F16H 7/18 |
| 2009/0111629 A1 | 4/2009 | Kobara et al. | |
| 2016/0252166 A1 * | 9/2016 | Noro | F16H 7/08 |
| | | | 474/111 |
| 2017/0184183 A1 * | 6/2017 | Noro | F16H 7/08 |
| 2021/0131531 A1 * | 5/2021 | Muratsubaki | F16H 7/06 |
| 2021/0156456 A1 * | 5/2021 | Watanabe | F16H 7/08 |
| 2021/0262552 A1 * | 8/2021 | Seki | F16H 7/08 |

FOREIGN PATENT DOCUMENTS

| | | | | |
|---|---|---|---|---|
| GB | 2348262 A * | 9/2000 | | F16H 7/08 |
| JP | 2009-108909 A | 5/2009 | | |
| WO | WO-2015180517 A1 * | 12/2015 | | F02B 67/06 |
| WO | WO-2019061464 A1 * | 4/2019 | | F16H 7/08 |
| WO | WO-2022028639 A1 * | 2/2022 | | F16H 7/08 |

\* cited by examiner

TENSIONER LEVER

BACKGROUND OF THE INVENTION

1. Field of the Invention

The present invention relates to a tensioner lever that slidably guides a running chain, and more particularly to a tensioner lever that is for a chain and that uses the resilient force of a torsion coil spring to press a shoe surface of a lever body against the chain, thereby slidably guiding the chain.

2. Description of the Related Art

Tensioner levers have been used in chain transmissions used for driving auxiliary machines or the like of car engines to remove slackness in the chain and to prevent vibration of the running chain. Among such tension levers, there is a known tensioner lever, which is oscillatably attached to an attachment surface of an engine block or the like, and includes a lever body having a shoe surface that slidably guides the chain, and a torsion coil spring interposed between the lever body and the attachment surface to press the shoe surface toward the chain (see, for example, Japanese Patent Application Laid-open No. 2009-108909).

This tensioner lever is attached to the attachment surface such that a helical part of the torsion coil spring is loosely fitted around an outer circumferential surface of a boss part formed to protrude from a base part of the lever body toward the attachment surface, that a pressing arm extending from one end of the helical part contacts the lever body, and that a distal end portion of a support arm extending from the other end of the helical part is inserted in a spring retention hole formed in the attachment surface. In such a tensioner lever, the load received from the chain twists the torsion coil spring, whereby a reaction force in accordance with the twisted amount (angular change of the pressing arm) is obtained.

Before such a tensioner lever is attached to the attachment surface, the distal end portion of the support arm extending from the other end of the helical part is locked by a stopper member mounted to the lever body, for example. In the tensioner lever described in Japanese Patent Application Laid-open No. 2009-108909, in consideration of the easiness of assembling the tensioner lever to the engine, a stopper pin mounting part having a pin lock hole, into which a pin member, i.e., a stopper member, is inserted into, is formed to a circular arc circumferential wall part, which defines therein a space for accommodating the helical part of the torsion coil spring, of the lever body so as to protrude outward.

SUMMARY OF THE INVENTION

In the structure where a coil spring is locked by a stopper pin, there is a clearance between the stopper pin and the pin insertion hole, because of which there is a risk that the support arm may shift along the axial direction of the stopper pin and disengage from the stopper pin during transport or shipment of the tensioner lever, which would make smooth operation of attaching the tensioner lever to an attachment surface difficult.

In the tensioner lever described in Japanese Patent Application Laid-open No. 2009-108909, a stopper pin mounting part is formed to a circular arc circumferential wall part, which defines therein a space for accommodating the helical part of the coil spring, of the lever body. Therefore, in a state in which the support arm is locked by the pin, the coil spring is largely resiliently deformed, and the stress constantly applied to the lever body may cause deformation of the lever body itself as time passes.

Moreover, the tensioner lever design does not give consideration to the backward movement, hence vibration and flapping of the chain may easily result from excessive tension of the chain during use.

The present invention solves these problems, and an object thereof is to provide a tensioner lever that allows for reduction of the number of components and the weight, while being able to prevent vibration and noise during the running of the chain.

The tensioner lever of the present invention includes: a lever body having a shoe surface, formed along a longitudinal direction to slidably guide a chain, and a base end rotatably supported on an attachment surface; and a coil spring interposed between the lever body and the attachment surface to press the shoe surface toward the chain, the coil spring including a helical part loosely fitted to a boss part provided to the lever body, a pressing arm extending from one end of the helical part and contacting the lever body, and a support arm extending from another end of the helical part and supported by the attachment surface, the lever body including an engagement portion with which the support arm removably engages and which retains the coil spring in a compressed state, the engagement portion being configured to allow the support arm to be hooked thereon by resilient deformation, and to engage therewith by rebound resilience of the coil spring. The problems described above are thereby solved.

According to the tensioner lever set forth in claim 1, the support arm of the coil spring is engaged with the engagement portion integrally formed with the lever body, utilizing the resilience of the coil spring itself. Since a stopper member such as a stopper pin is not necessary, the number of components is reduced, so that the weight can be reduced. The support arm is configured to engage with the engagement portion without looseness, and not to be readily disengaged from the engagement portion during transportation or shipment of the tensioner lever. At the same time, the support arm of the coil spring can be readily disengaged from the engagement portion by resilient deformation thereof, which allows for smooth assembling to an engine.

According to the configuration set forth in claim 2, the amount of bending of the coil spring required for the support arm to engage with the engagement portion is reduced, so that the load applied to the lever body in a state in which the support arm is engaged with the engagement portion can be reduced. Thus deformation of the lever body can be prevented, and also, the coil spring can be assembled to the lever body and the chain tensioner can be attached to an attachment surface smoothly.

According to the configuration set forth in claim 3, an accidental disengagement of the support arm from the engagement portion can be reliably prevented.

According to the configuration set forth in claim 4, the locking arm part abutting on the engagement portion restricts the backward movement of the tensioner lever relative to the chain, so that a backstop mechanism that reliably stops the lever body from moving back largely can be realized by the tensioner lever alone, without another mechanism such as another tensioner. Therefore chain flapping and accompanying noise or vibration can be minimized even when there is excessive tension on the chain during use.

DESCRIPTION OF THE PREFERRED EMBODIMENTS

A tensioner lever that is one embodiment of the present invention will be hereinafter described with reference to the drawings.

Figure 1:
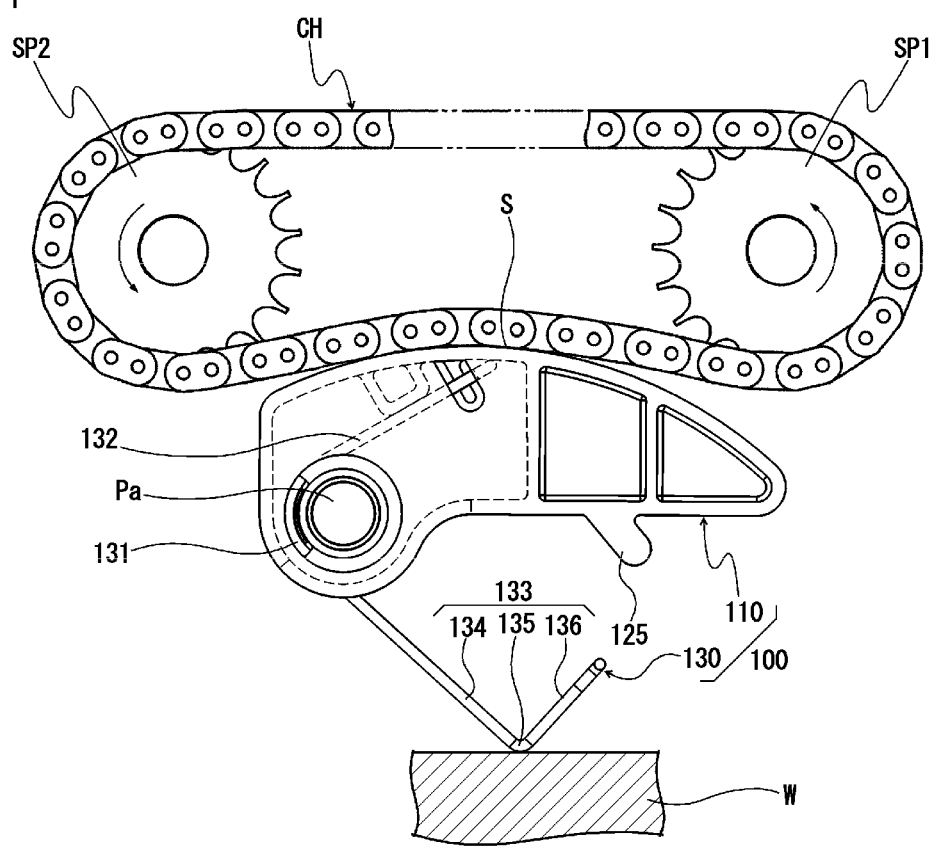
FIG. 1 is a diagram illustrating one example of a manner of use of a tensioner lever that is one embodiment of the present invention.

The tensioner lever 100 slidably guides a chain CH passed around between a drive-side sprocket SP1 attached to a crankshaft and a driven-side sprocket SP2 attached to a shaft of an auxiliary machine, as illustrated in FIG. 1, to keep an appropriate tension.

This tensioner lever 100 includes a lever body 110 having a shoe surface S formed along a longitudinal direction for slidably guiding the chain CH and a base end rotatably supported by a pivot shaft Pa protruding from an engine block (not shown), and a coil spring 130 interposed between the lever body 110 and the attachment surface to press the shoe surface S against the chain CH.

The lever body 110 is made of a synthetic resin, for example, and the coil spring 130 is made of metal, for example.

Figure 2:
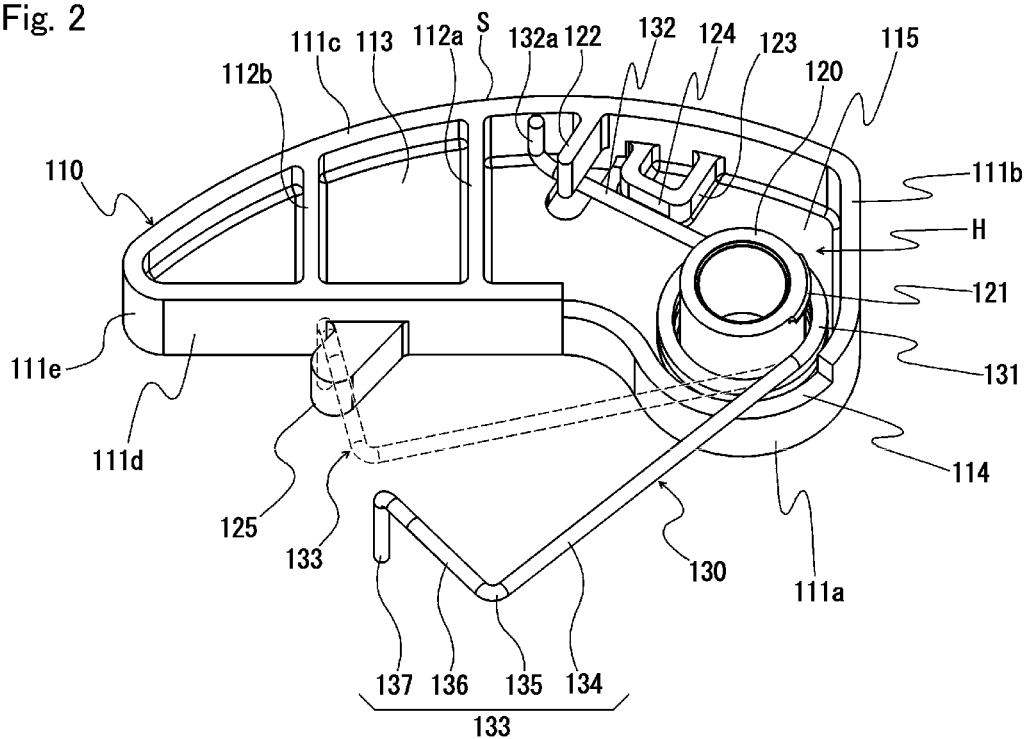
FIG. 2 is a perspective view illustrating the configuration of the tensioner lever viewed from the side to be attached to an attachment surface.
Figure 3:
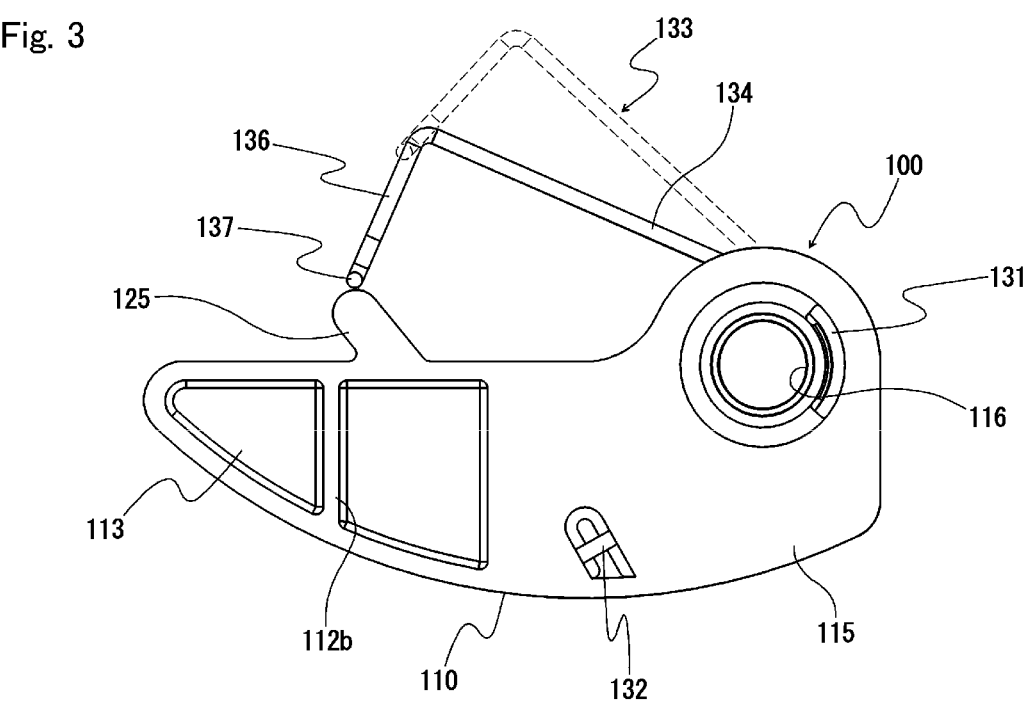
FIG. 3 is a plan view illustrating the configuration of the tensioner lever viewed from the opposite side from the attachment surface.

The lever body 110 has lever circumferential walls formed substantially in a comma-like shape in plan view, as illustrated in FIG. 2 and FIG. 3, as viewed from the axial direction (in which the pivot shaft Pa extends).

The lever circumferential walls include: a circular arc circumferential wall part 111a having a shape conforming to the circumference of a concentric circle having the same center as the pivot shaft Pa; a substantially planar circumferential wall part on one side 111b continuous with one end of the circular arc circumferential wall part 111a and extending toward the chain CH; a chain-side circumferential wall part 111c with one end smoothly continuing from the other end of the circumferential wall part on one side 111b, extending toward the distal end in a shape conforming to a circular arc convex toward the chain CH; a substantially planar non-chain-side circumferential wall part 111d with one end smoothly continuing from the other end of the circular arc circumferential wall part 111a, and extending toward the base end on the opposite side of the chain-side circumferential wall part 111c; and a circumferential wall part on the other side 111e in a circular arc shape smoothly continuing from the other ends of each of the chain-side circumferential wall part 111c and the non-chain-side circumferential wall part 111d. An outer surface of the chain-side circumferential wall part 111c facing the chain CH is configured as the shoe surface S that slidably guides the chain CH.

The space surrounded by the lever circumferential walls is partitioned to two cavities in the longitudinal direction by a reinforcing rib part 112a provided between the chain-side circumferential wall part 111c and the non-chain-side circumferential wall part 111d. One of the cavities positioned on the base end forms a spring accommodating part H. The cavity positioned on the distal end is partitioned in the axial direction (in which the pivot shaft Pa extends) by a partition wall part 113 and each part of the divided cavity on the attachment side and the opposite side is provided with a reinforcing rib part 112b extending parallel with the reinforcing rib part 112a between the chain-side circumferential wall part 111c and the non-chain-side circumferential wall part 111d.

This design intends to reduce the weight of the lever body 110 while providing the lever body 110 with a structure that can withstand twisting sufficiently.

In a section of the lever circumferential walls defining the coil spring accommodating part H is a lever-side wall part 115 that covers the coil spring accommodating part H formed continuously from an end face on the opposite side from the attachment surface.

The lever-side wall part 115 is formed with a shaft hole 116 in which the pivot shaft Pa is inserted (see FIG. 3). A cylindrical boss part 120 is integrally formed to the lever-side wall part 115 such as to protrude from the circumferential edge of the shaft hole 116 toward the attachment surface. With the pivot shaft Pa being inserted into the boss part 120, the lever body 110 is rotatably (oscillatably) supported on the attachment surface.

The end face of the boss part 120 on the side facing the attachment surface is formed to protrude slightly more toward the attachment surface than the end face of the lever circumferential wall, which prevents other parts than this end face of the boss part 120 on the side facing the attachment surface from contacting the attachment surface, so that smooth rotation (oscillation) of the lever body 110 around the pivot shaft Pa is ensured.

A restricting protrusion 121 is formed on an outer circumferential surface of the boss part 120 at the end on the side facing the attachment surface to restrict the coil spring 130 from moving toward the attachment surface. This way, in a state before the tensioner lever 100 is attached to the attachment surface, the coil spring 130 is prevented from coming off of the lever body 110, and also, in a state where the tensioner lever 100 is attached to the attachment surface, the coil spring 130 is prevented from interfering with the attachment surface.

The coil spring 130 includes a helical part 131, a pressing arm 132 extending straight from one end of the helical part 131 positioned on the side closer to the lever-side wall part 115, and a support arm 133 extending from the other end of the helical part 131 on the side facing the attachment surface.

The helical part 131 is set loosely on the outer circumferential surface of the boss part 120 in the coil spring accommodating part H, i.e., with a clearance fit on the outer circumferential surface of the boss part 120.

The pressing arm 132 has a distal end portion 132a set in contact with the inner surface of the chain-side circumferential wall part 111c. The distal end portion 132a of the pressing arm 132 is bent toward the attachment surface in the coil axis direction of the helical part 131.

The pressing arm 132 is stopped by a spring lock rib 122 protruded from the inner surface of the chain-side circumferential wall part 111c, so that a correct contact state of the distal end portion 132a of the pressing arm 132 on the inner surface of the chain-side circumferential wall part 111c is secured.

The support arm 133 includes a rotation arm part 134 extending straight out of the lever body 110 through a cut-out portion 114 formed in the end face on the attachment side of the circular arc circumferential wall part 111a, and a locking arm part 136 extending continuously from the distal end of the rotation arm part 134 via a bent portion 135, which constitutes a support part supported on the attachment surface, and toward an engagement portion 125 formed on the lever body 110.

The locking arm part 136 is bent toward the helical part 131 within a plane vertical to the coil axis of the helical part 131 to extend in a direction orthogonal to the rotation arm part 134.

The locking arm part 136 has a hook portion 137 at the distal end to engage with the engagement portion 125 formed on the lever body 110. In this embodiment, the hook portion 137 is formed in an L shape, with a distal end portion of the straight locking arm part 136 being bent to extend toward outside in the coil axis direction of the helical part 131 (opposite side from the attachment surface).

As illustrated in FIG. 1, in a state in which the tensioner lever 100 is attached to the attachment surface, the bent portion 135 abuts on and is supported by a support wall portion W on the attachment surface, so that the resilient force of the coil spring 130 exerts a torque on the lever body 110 around the pivot shaft Pa toward the chain CH.

In the tensioner lever 100 of this embodiment, as illustrated in FIG. 2, an abutment wall portion 123 is formed on the inner surface of the chain-side circumferential wall part 111c, for making contact with the pressing arm 132 when the pressing arm 132 receives more than a certain load from the chain CH and warps convexly toward the chain-side circumferential wall part 111c.

The abutment wall portion 123 has an inner wall surface 124 opposite the pressing arm 132, spaced apart from the circumferential surface of the pressing arm 132 when the tensioner lever 100 is attached to the attachment surface. The inner wall surface 124 is configured such that, as the pressing arm 132 receives more than a certain load from the chain CH, the area of contact between the pressing arm 132 and the abutment wall portion 123 gradually increases. In this embodiment, the inner wall surface 124 of the abutment wall portion 123 is a flat surface.

When the pressing arm 132 receives more than a certain load from the chain CH, this configuration splits the load from the chain CH, which allows the coil spring 130 to have a higher spring load and to be able to prevent the chain CH from flapping at the start-up of the engine, and to be able to exert appropriate reaction forces to tension fluctuations caused by sudden changes in the chain movement.

As described above, before the tensioner lever 100 is attached to the attachment surface, the support arm 133 of the coil spring 130 is engaged with the engagement portion 125 so that the coil spring 130 is retained in a compressed state, as indicated with broken lines in FIG. 2.

The engagement portion 125 protrudes from an outer surface of the non-chain-side circumferential wall part 111d diagonally toward the distal end of the longitudinal direction, so that the support arm 133, by being resiliently deformed, allows the hook portion 137 to be hooked thereon, and to be engaged therewith by the rebound resilience of the coil spring 130.

The engagement portion 125 in this embodiment is formed wide in the length direction of the hook portion 137 of the coil spring 130, with a distal end portion being formed in a circular arc shape to serve as a guide surface for the locking arm part 136. This structure can reliably prevent an accidental disengagement of the support arm 133 from the engagement portion 125, while allowing the support arm 133 to readily engage with the engagement portion 125.

The engagement portion 125 is provided to the lever body 110 at a center position in the longitudinal direction of the lever body 110 or closer to the distal end from a center of gravity of the lever body 110. With the engagement portion 125 being provided at such a position, the load applied to the lever body 110 by the coil spring 130 before the tensioner lever 100 is attached to an attachment surface can be reduced. Thus deformation of the lever body 110 such as torsion resulting from the spring load of the coil spring 130 can be reliably prevented.

In this embodiment, as illustrated in FIG. 3, the distal end portion of the engagement portion 125 is located on a rotation track of the distal end of the locking arm part 136 rotating with the support arm 133. Therefore, the locking arm part 136 abutting on the engagement portion 125 restricts the backward movement of the tensioner lever 100 relative to the chain CH, so that a backstop mechanism that reliably stops the lever body 110 from moving back largely is realized by the tensioner lever 100 alone, without another mechanism such as another tensioner.

In the tensioner lever 100 of this embodiment, the support arm 133 is resiliently deformed to allow the hook portion 137 to ride over the engagement portion 125 onto the distal end surface thereof in the longitudinal direction, where the rebound resilience of the coil spring 130 causes the hook portion 137 to engage with (locked by) the engagement portion 125. Conversely, by deforming the support arm 133 resiliently to allow the hook portion 137 to ride over the engagement portion 125, the support arm 133 can be disengaged from the engagement portion 125.

While one embodiment of the present invention has been described above in detail, the present invention is not limited to the embodiment described above. Various design changes may be made without departing from the scope of the present invention set forth in the claims.

For example, the support arm of the coil spring and the engagement portion of the lever body may be formed in any way as long as the support arm can hook on the engagement portion by resilient deformation, and the support arm and the engagement portion engage with each other by rebound resilience of the coil spring.

The support arm is not limited to a particular shape. The shape of the support arm can be changed as required by the positional relationship with the engagement portion on the lever body, in accordance with the purpose of use. The support arm may be, for example, curved outward in a circular arc. Further, as opposed to the embodiment above in which the support arm of the coil spring includes a locking arm part, the support arm may not necessarily include the locking arm part, or, the locking arm part may not necessarily include the hook portion and may extend straight.

What is claimed is:

1. A tensioner lever comprising:
a lever body having a shoe surface, formed along a longitudinal direction to slidably guide a chain, and a base end rotatably supported on an attachment surface; and
a coil spring interposed between the lever body and the attachment surface to press the shoe surface toward the chain,
the coil spring including a helical part loosely fitted to a boss part provided to the lever body, a pressing arm extending from one end of the helical part and contacting the lever body, and a support arm extending from another end of the helical part and supported by the attachment surface,
the lever body including an engagement portion with which the support arm removably engages and which retains the coil spring in a compressed state, the engagement portion being configured to allow the support arm to be hooked thereon by resilient deformation, and to engage therewith by rebound resilience of the coil spring; and the support arm including a rotation arm part extending straight out of the lever body, and a locking arm part extending continuously from the rotation arm part via a bent portion which constitutes a support part supported on the attachment surface;

wherein the locking arm part is bent, within a plane vertical to the coil axis, toward a side where there is the helical part to extend in a direction orthogonal to the rotation arm part; and in a state in which the support arm is engaged with the engagement portion, the bent portion constituting the support part supported on the attachment surface is separated from the engagement portion in a direction of rotation of the rotation arm part.

2. The tensioner lever according to claim 1, wherein the engagement portion is provided to the lever body at a center position in the longitudinal direction of the lever body or at a position further toward a distal end thereof than a center of gravity of the lever body, and the locking arm part of the support arm extending toward the engagement portion from the support part supported on the attachment surface.

3. The tensioner lever according to claim 2, wherein the locking arm part has, at a distal end thereof, a hook portion formed to extend along a coil axis direction of the helical part and engage with the engagement portion, and the engagement portion is formed wide along a longitudinal direction of the hook portion.

4. The tensioner lever according to claim 2, wherein the engagement portion protrudes from an outer surface of a circumferential wall portion of the lever body such that a distal end portion thereof is located on a rotation track of the distal end of the locking arm part, with the support arm rotating.

* * * * *